July 31, 1962 B. SEAMAN 3,046,970

BARBECUE GRILL

Filed Feb. 25, 1960

INVENTOR.
BERNARD SEAMAN
BY
ATTORNEYS

United States Patent Office 3,046,970
Patented July 31, 1962

3,046,970
BARBECUE GRILL
Bernard Seaman, 60 Fairview Ave., Tarrytown, N.Y.
Filed Feb. 25, 1960, Ser. No. 11,038
6 Claims. (Cl. 126—25)

This invention relates to cooking apparatus and, more particularly, to a barbecue grill.

Ordinarily, a barbecue grill occupies a substantial amount of space when in use, and is also bulky and difficult to store when not in use. It is therefore an object of the present invention to provide a barbecue grill assembly of extremely simple construction, which is efficient in use and can be readily stored in a small space.

Another object of the present invention is to provide a barbecue grill constructed from a plurality of substantially identical elements bound together for selective movement between an expanded operative position and a contracted storage position with a minimum amount of effort.

Still another object of the present invention is to provide a barbecue grill which is safely maintained in its expanded operative position.

A further object of the present invention is to provide a barbecue grill of the type described which may be conveniently used in sheltered outdoor areas and within inside fireplaces to facilitate the starting of a barbecue fire and the maintenance thereof in an effective relationship with respect to the food being prepared.

A more specific object of the present invention is to provide a collapsible barbecue grill of the above type which can be manufactured in large quantities at a relatively low cost, is easy to clean and maintain, and which is extremely durable.

All of the foregoing and still further objects and advantages of this invention will become apparent from a study of the following specification, taken in connection with the accompanying drawing, wherein.

Figure 1:
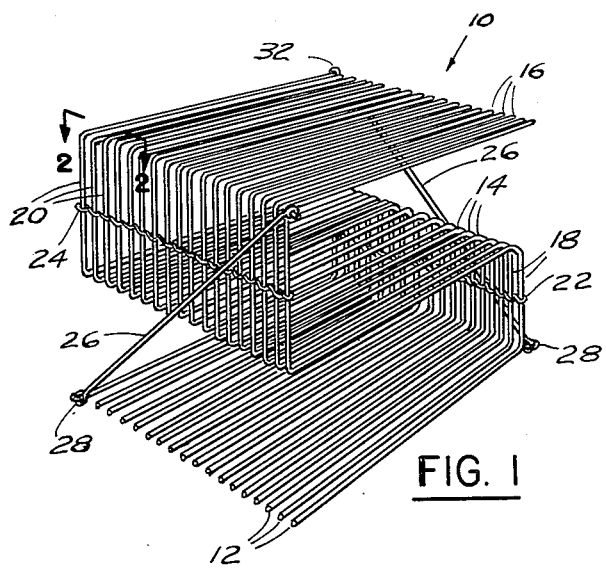
FIG. 1 is a perspective view of a barbecue grill assembly made in accordance with the present invention in an open expanded position ready for use.
Figure 3:
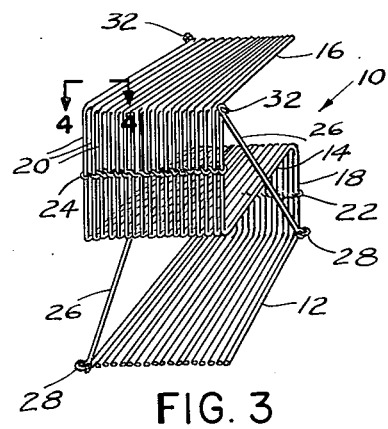
FIG. 3 is a view similar to FIG. 1, showing the parts in a collapsed storage position.

Referring now to the drawing, and more particularly to FIGS. 1 to 5 thereof, a barbecue grill 10 made in accordance with the present invention is shown to include a framework having a plurality of substantially identical S-shaped elements preferably made of sturdy wire and fastened together for selective accordion type movement between a collapsed or closed storage position, as shown in FIG. 3, and an extended open position as shown in FIG. 1.

Each S-shaped element includes three spaced apart parallel members 12, 14, 16, a first riser 18 extending between one end of one pair of adjacent ones of the members 12, 14, and a second riser 20 extending between the adjacent opposite ends of another pair 14, 16 of adjacent ones of the members. All of the S-shaped elements are maintained in juxtaposition by means of flexible and expansible tie means that connect adjacent corresponding portions of each of the S-shaped elements together.

Figure 2:
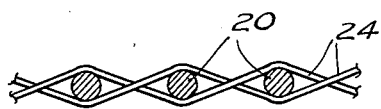
FIG. 2 is an enlarged fragmentary cross sectional view taken along line 2—2 of FIG. 1, showing the position of the adjacent members in the expanded open position.
Figure 4:
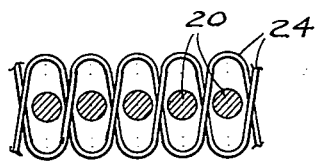
FIG. 4 is an enlarged fragmentary cross sectional view taken along line 4—4 of FIG. 3, showing the relationship of adjacent parts in a collapsed position.
Figure 5:
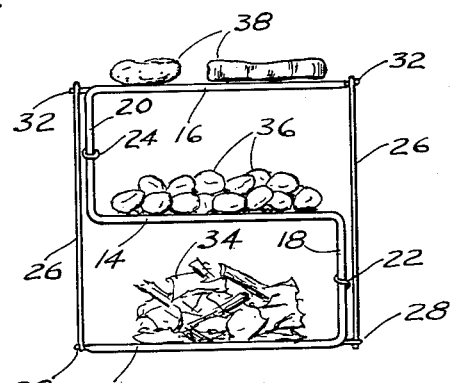
FIG. 5 is an elevational side view of the assembly shown in FIG. 1 in actual use.
Figure 6:
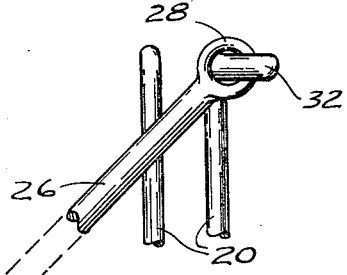
FIG. 6 is an enlarged fragmentary elevational side view of certain parts of the grill assembly shown in FIG. 1, illustrating the manner in which spacer means maintain the assembly in the expanded open position.

As is more clearly shown in FIGS. 2 and 4 of the drawing, the flexible tie means used to connect all of the S-shaped elements together, include flexible heat resistant strands 22, 24 of cable-like material which are crisscrossed over the opposite sides of each riser 18, 20, respectively of all of the S-shaped elements. The flexible cable elements 22, 24 are loosely entwined about the risers of the S-shaped elements, as shown, to enable such risers and other parts of each S-shaped element to be moved with respect to adjacent ones of the S-shaped elements between the expanded operative position shown in FIG. 1 and the collapsed closed storage position illustrated in FIG. 3.

The assembly also includes at least one and preferably two rigid spacer rods 26, each of which has an eye portion 28 at each end. One such eye member 28 of each rigid spacer rod 26 is pivotally connected to a similar eye member 30 formed at one of an outermost one of the parallel members 12 of the S-shaped elements, whereas the corresponding end of the opposite outermost one of the members 16 of the S-shaped elements is provided with a mounting stud 32 which is receivable within the eye element 28 at the opposite end of the respective rigid spacer rod 26. Thus, in the expanded open operative position of the grill illustrated in FIG. 1, the spacer rods 26 extend diagonally across the respective sides of the grill to maintain the end S-shaped elements thereof in the expanded position. However, in order to collapse the grill for storage purposes, it is only necessary to disengage the end of each spacer rod 26 from the mounting stud 32, thus allowing the S-shaped elements to be moved toward each other into a compacted state, such as that shown in FIG. 3. The spacer rods 26 may then be extended diagonally across the respective ends of the compacted grill so that the free end of each such spacer rod 26 is engaged with the mounting stud 32 carried by the same end one of the S-shaped elements. Since the diagonal distance between the eye shaped mounting element 30 and mounting stud 32 on each end S-shaped element is the same as the distance between the mounting member 30 of one end element and the mounting stud 32 of the other end element in the expanded position, the free end of the spacer rod 26 is accommodated readily in either the expanded position of the grill or the collapsed position thereof, as is clearly illustrated in FIGS. 1 and 3. Of course, the spacer rods may also be placed parallel to members 12 and 16.

In actual use, the grill is expanded to the position shown in FIG. 1 and the spacer rods 26 mounted in the manner shown. Kindling paper and/or wood 34 may be placed upon the lowermost platform formed by the lower members 12; charcoal, briquettes 36, and the like, may be placed upon the center one of the platforms formed by the intermediate members 14; and the food 38 to be prepared may be placed upon the uppermost platform formed by the other members 16. It will be noted that each pair of adjacent members 12, 14, 16 and the respective ones of the risers 18, 20 defines a three sided compartment which serves to protect the kindling 34 and briquettes 36 against being blown away, while allowing sufficient passage of air therethrough for efficient and fast burning of such material. This is especially important for indoor use of the grill in order to provide for combustion of the fuel in enclosed areas, such as in fireplaces.

After use, the grill is readily cleaned and collapsed into the compacted storage position, as shown in FIG. 3, so that it may be readily stored in a minimum amount of space. Due to the fire resistant characteristics of the cables 22, 24, they are long lasting and maintenance-free throughout the life of the grill.

For outdoor use, the barbecue grill may be placed in any sheltered area or out of heavy winds, in order to provide for the proper distribution of heat to the food being prepared and to prevent undue scattering of the kindling and other fuel supported upon the central and lowermost platforms.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A barbecue grill comprising, in combination, a plurality of substantially identical S-shaped elements each having a plurality of spaced apart parallel members extending between alternately opposite ends of adjacent ones of said members, the corresponding ones of said members of all of said elements defining individual article supporting platforms, and risers extending between said platforms defining at least one pair of oppositely opening individual three sided compartments for receiving separate material therewithin.

2. A barbecue grill as set forth in claim 1, further comprising expansible tie means guiding said elements in juxtaposition for selective movement between an operative spaced apart relationship and a closed storage contracted relationship.

3. A barbecue grill as set forth in claim 2, wherein said tie means comprises flexible cables loosely criss-crossed over the opposite sides of each riser of all of said elements.

4. A barbecue grill comprising, in combination, a plurality of substantially identical S-shaped elements each having three spaced apart parallel members, a first riser extending between one end of one pair of adjacent ones of said members, a second riser extending between the adjacent opposite ends of another pair of adjacent ones of said members, expansible tie means connecting said elements together for guided movement between a closed storage position, and an open operative spaced apart relationship, and spacer means carried by each outermost one of said S-shaped elements selectively engageable with the opposite outermost one of said S-shaped elements in said open position of said grill to maintain said plurality of elements in said spaced apart relationship.

5. A barbecue grill as set forth in claim 4, wherein said spacer means comprises at least one substantially rigid rod having on one end a pivotal connection with one end of one of said members of one outermost S-shaped element, and one end of another one of said members of the opposite outermost one of said S-shaped elements having mounting means for secure engagement with the opposite end of said rigid rod.

6. A barbecue grill as set forth in claim 5, wherein said mounting means comprises a stud, and said opposite end of said rigid rod defines an eye for receiving said stud therewithin.

References Cited in the file of this patent

UNITED STATES PATENTS

| | | |
|---|---|---|
| 898,828 | Brown | Sept. 15, 1908 |
| 955,140 | Cronk | Apr. 19, 1910 |
| 969,495 | Rape | Sept. 6, 1910 |
| 1,124,551 | Stumpf | Jan. 12, 1915 |
| 1,569,401 | Sims | Jan. 12, 1926 |
| 2,597,477 | Haislip | May 20, 1952 |
| 2,920,614 | Phelps | Jan. 12, 1960 |

FOREIGN PATENTS

| | | |
|---|---|---|
| 1,805 | Great Britain | 1889 |
| 22,324 | Great Britain | 1900 |